United States Patent
Lebo

[19]

[11] Patent Number: 5,900,808
[45] Date of Patent: May 4, 1999

[54] LOW PRESSURE WARNING SYSTEM

[76] Inventor: Michael E. Lebo, 3172 Pasternack Pl., San Diego, Calif. 92123-3058

[21] Appl. No.: 08/804,744

[22] Filed: Feb. 21, 1997

[51] Int. Cl.$^6$ .................................................... B60C 23/00
[52] U.S. Cl. ........................................... 340/442; 340/447
[58] Field of Search .................................... 340/442, 443, 340/444, 445, 446, 447, 448; 73/146.2, 146.3, 146.4, 146.5; 116/34 R; 200/61.22

[56] References Cited

U.S. PATENT DOCUMENTS

| | | | |
|---|---|---|---|
| 4,701,742 | 10/1987 | Ruehr | 340/442 |
| 5,109,213 | 4/1992 | Williams | 340/447 |
| 5,285,189 | 2/1994 | Nowicki et al. | 340/447 |
| 5,289,161 | 2/1994 | Huang | 340/447 |
| 5,302,939 | 4/1994 | Downs et al. | 340/442 |
| 5,463,374 | 10/1995 | Mendez et al. | 340/442 |
| 5,559,484 | 9/1996 | Nowicki et al. | 340/442 |
| 5,602,524 | 2/1997 | Mock et al. | 340/447 |
| 5,635,691 | 6/1997 | Ballyns | 340/442 |
| 5,637,926 | 6/1997 | Zedonis | 340/442 |

*Primary Examiner*—Nina Tong
*Attorney, Agent, or Firm*—Steins & Associates

[57] ABSTRACT

A Low Pressure Warning Device, System and Method is disclosed. The disclosed system is compact, and low cost but has an extremely long term service life. Further disclosed is sensing means that actively monitors the pressure conditions of a pneumatic chamber without drawing electrical power. The disclosed preferred sensing means will further detects various conditions, including activation-, normal- and low-pressure conditions. Also disclosed is a device that is installable within the pneumatic tire of a vehicle such that it is theft- and tamper-resistant. The disclosed device is resistant to truck tire operating temperatures and is further provided with a protective casing to prevent damage or contamination of the system components. Still further disclosed are a transmitter and receiver that are configured to transmit and receive encoded signals to permit great flexibility in vehicle monitoring combinations, while also providing the localization of the pneumatic chamber experiencing a low pressure condition. The disclosed transmitter provides alarm signal transmissions that are pulsed to shorten transmission duration and consequently reduce transmitter power consumption as well as improve receiver reliability. Also disclosed is a transmitter-sensor that includes battery prolonging means to retard passivation layer buildup within the battery.

20 Claims, 7 Drawing Sheets

LOW PRESSURE WARNING SYSTEM

BACKGROUND OF THE INVENTION

1. Field of the Invention

This invention relates generally to warning systems and, more specifically, to a Low Pressure Warning System that provides extremely efficient, long-term performance.

2. Description of Related Art

Vehicle low-tire-pressure warning devices and systems have been available for many years. In general, these systems provide an alert to the operator of a vehicle in the event that the pneumatic pressure in one or more of the vehicle's tires has dropped below a pre-determined safe level. These systems and devices are particularly appropriate in multi-axled vehicles, such as commercial 18-wheeled vehicles, because they typically are impacted severely in the event of a flat tire. Since these vehicles are not typically equipped to change their own tires, they must call for outside assistance and then wait for the repairs to take place; this process is typically very time-consuming (and consequently expensive). If there were a warning device that would alert the driver of a low tire pressure condition before the tire beat itself to death on the rim, the driver might have the opportunity to make a controlled stop at a gas station or the like, where the repairs could be effected more quickly. This would also prevent damage to the tires that are adjacent to the defective tire.

A significant problem with any prior tire pressure alarm system is that of longevity. If the monitor is small enough to be placed internal to the tire, it must have its own electrical power supply. Most prior systems impose a constant current draw on this local power supply (or battery) while simply monitoring the normal pressure conditions within the tire. Consequently, the battery is in use at all times, and its life is unacceptably short. What is needed is a tire pressure monitoring and alarm system that is able to monitor the tire's pressure without imposing any current draw on the local power supply in so doing.

Examples of prior, unsuccessful, tire pressure monitoring and warning systems are Williams, U.S. Pat. No. 5,109,213, Nowicki, et al, U.S. Pat. No. 5,285,189 and Mendez, et al, U.S. Pat. No. 5,463,374.

Williams discloses a complicated, expensive systems that will be difficult to maintain over the working life of a vehicle. Specifically, the Williams device uses battery power while tire pressure is in its normal operating range. This means that the battery on each wheel would require replacement several times during the ten-year shelf life of the battery. Furthermore, the device is installed on the fill stem for pressurizing the tire, and as such, is exposed to the environmental elements, not to mention theft. Still further, the Williams device is rather large, and as such will make balancing the wheel difficult once it is installed. Also, since the Williams device installs on the stem, it is subject to gas leaks, which will itself cause the tire to go flat!

The Nowicki device seeks to reduce power draw on the local power supply by incorporating a centrifugal switch that disables the system (and power draw) when the wheel is not rotating at a rate indicating that the vehicle is in service. The drawback of this method is that most commercial vehicles spend a great deal of time in service, driving around. During these times, the Nowicki device will be energized and will draw power from the battery, even when the tire is at a safe pressure.

The Mendez, while combining several other alarm features beyond tire pressure warning, also fails to disclose or imply a device that functions to solve the longevity problem. Although the Mendez device does use a low battery current, this draw, like Nowicki and Williams is present even when the tire is at its normal operating pressure. Furthermore, the Mendez system is not a practical solution for most vehicles, since it is actually part of the original equipment of the vehicle; it is not feasible to install the Mendez system into a wide range of vehicles already on the road.

The device and system of the present invention, as detailed herein, solves all of these problems while further providing other advantages over any other relevant system elsewhere disclosed or implied.

SUMMARY OF THE INVENTION

In light of the aforementioned problems associated with the prior devices, it is an object of the present invention to provide a Low Pressure Warning System. It is a further object that the present invention provide a system that is compact, and low cost but has an extremely long term service life. It is a critical object of the present invention that the sensing means actively monitor the pressure conditions of a pneumatic chamber without drawing electrical power. The preferred sensing means will further detect various conditions, preferably including activation-, normal- and low-pressure conditions. It is another object that the present invention be installable within the pneumatic tire of a vehicle such that it is theft- and tamper-resistant. It is a further object that the transmitter of the present invention be resistant to truck tire operating temperatures and to further be provided with a protective casing to prevent damage or contamination of the system components. It is a still further object that the transmitter and receiver of the present invention be configured to transmit and receive encoded signals to permit great flexibility in vehicle monitoring combinations, while also providing the localization of the pneumatic chamber experiencing a low pressure condition. It is a further object that the alarm signal transmissions be pulsed to shorten transmission duration and consequently reduce transmitter power consumption as well as improve receiver reliability. It is a still further object that the transmitter-sensor of the present invention include battery prolonging means to retard passivation layer buildup within the battery.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Low Pressure Warning Device, System and Method.

Figure 1:
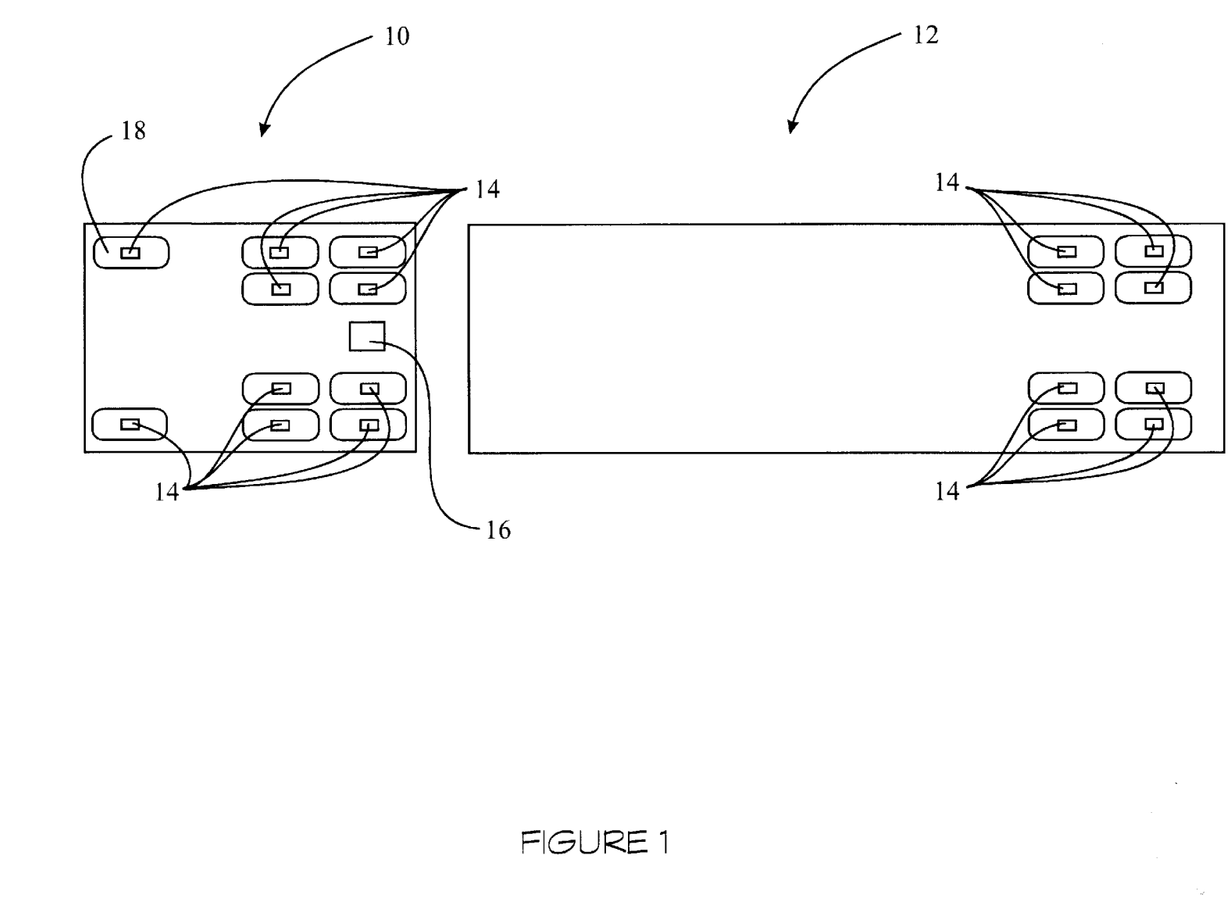
FIG. 1 is a bottom view of a line drawing of a tractor and trailer of an 18-wheeled truck with the present invention installed therein.

The present invention can best be understood by initial consideration of FIG. 1. FIG. 1 is a bottom view of a line drawing of a tractor 10 and trailer 12 of an 18-wheeled truck with the present invention installed therein. Although the present invention is properly installable in a variety of environments, including a variety of vehicles, one preferred installation involves detecting low tire pressures in 18-wheeled truck. In its preferred form, the present invention will comprise a series of sensor-transmitters 14 in communication with a receiver 16. As can be seen in this embodiment, each tire 18, for example, is monitored by a separate sensor-transmitter 14. It may be possible that a single transmitter may actually monitor or sense abnormal pressure conditions in more than one tire, depending upon the particular application for the device. Furthermore, each tire 18, for example, may include backup sensors and/or sensor-transmitters 14, if backup is desired.

In operation, each sensor-transmitter 14 is actively monitoring the gas pressure of it respective tire 18, for example. When pre-determined low pressure condition is reached and detected within the tire 18, for example, the sensor-transmitter 14 will transmit a signal to the receiver 16. The receiver 16 will then act to notify the vehicle's driver of the low pressure condition.

Each sensor-transmitter 14 may be assigned its own individual identification, that may be recognized and be caused to be displayed by the receiver. In this manner, the vehicle driver will immediately know which tire 18, for example, is in a low pressure condition. It may also be desirable to have all tires assigned to a single identification (per vehicle), in which case the driver will have to conduct further manual inspection of each tire 18 by "bouncing" a club or the like against each tire 18 to conclude which one is in a low pressure condition (this is a common practice for truck drivers today). The single-identification system will allow for a simpler system that is less costly to the user. Furthermore, if the tires are replaced, or tire locations are changed, the process will not involve the complexity of assigning or re-assigning the proper code to the proper sensor-transmitter 14. A unique identification code could be used for all trucks in a fleet so that any tractor 10 will monitor the tires 18 of any trailer 12 in that fleet. In an alternative configurations, it might be better to have a universal code which could be used by the entire trucking industry. Furthermore, multiple codes could be transmitted by a single sensor-transmitter 14, such as a universal code, a fleet code, a vehicle code and a tire code, or any combination of the above codes. It should also be appreciated that the present invention has a wide variety of applications beyond that of a vehicle tire. In particular, inflatable life boats on large ships would be an ideal application, in addition to many other situations.

Figure 2:
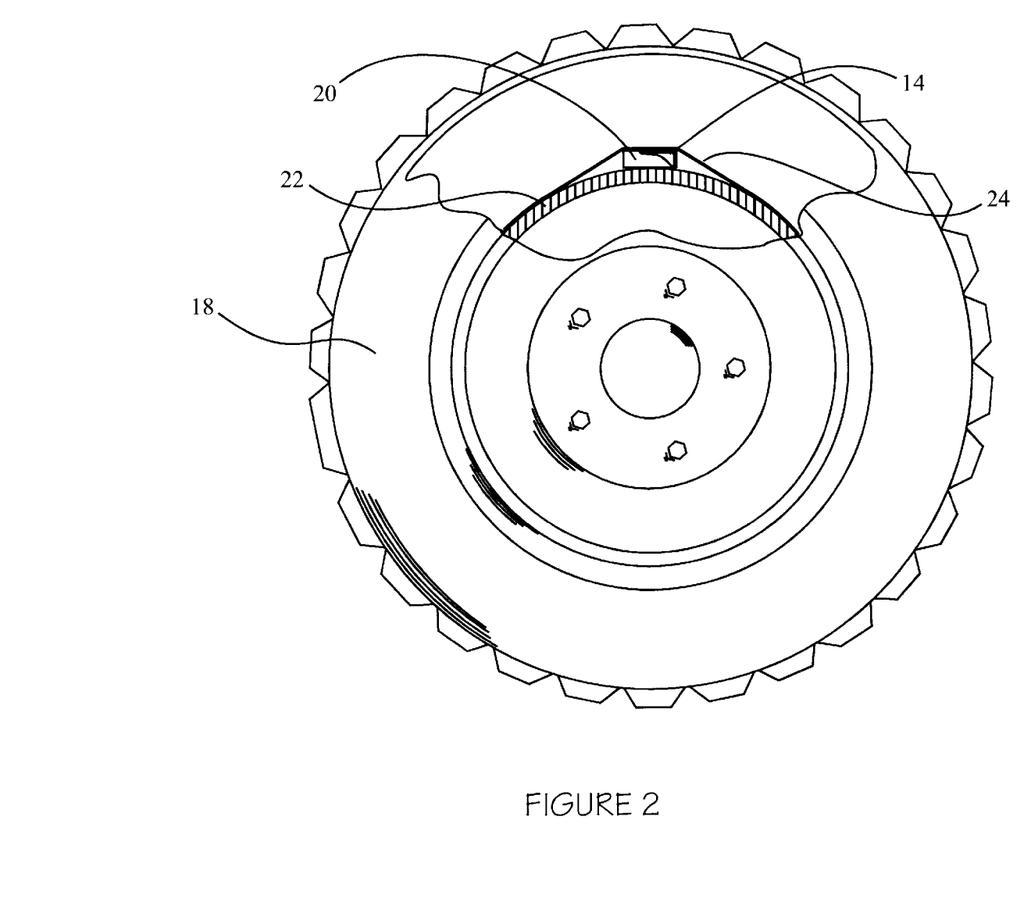
FIG. 2 is partial cutaway side view of a tire of the truck of FIG. 1, depicting the location and mounting of a preferred sensor-transmitter of the present invention.

Now turning to FIG. 2, we might appreciate how each sensor-transmitter is located within the tire 18, for example.

FIG. 2 is partial cutaway side view of a tire 18 of the truck of FIG. 1, depicting the location and mounting of a preferred sensor-transmitter 14 of the present invention. As can be seen, the sensor-transmitter 14 is mounted within the gas chamber of the tire 18. As depicted, the sensor-transmitter 14 preferably includes a casing 20 disposed over substantially the entirety of the sensor-transmitter 14 to protect it from contaminants within the tire 18. The casing 20 may be made from "Mylar" or other lightweight, durable, particle- and moisture-impregnable material. The sensor-transmitter 14 is attached to the rim 22 prior to installation and inflation of the tire 18. No modification of the tire 18 or the rim 22 is required; the sensor-transmitter 14 is attached to the rim 22 via a mounting means 24, which may essentially comprise wrapping fiberglass mounting tape around that rim 22 and sensor-transmitter 14. Although other materials old in the art may be used, fiberglass mounting tape is particularly suitable because it is inexpensive, strong, durable, and furthermore is non-metallic, so that it will not interfere with the radio frequency field of the sensor-transmitter 14, which may be in wireless communication with the receiver (see FIG. 1).

As can be appreciated, the sensor-transmitter 14 is fully self-contained within the tire 18. Furthermore, the device and its installation are lightweight in order to minimize the imbalance created within the tire; normal tire balancing maintenance (routine during tire installations) will correct the imbalance without the necessity for special procedures or apparatus.

Figure 3:
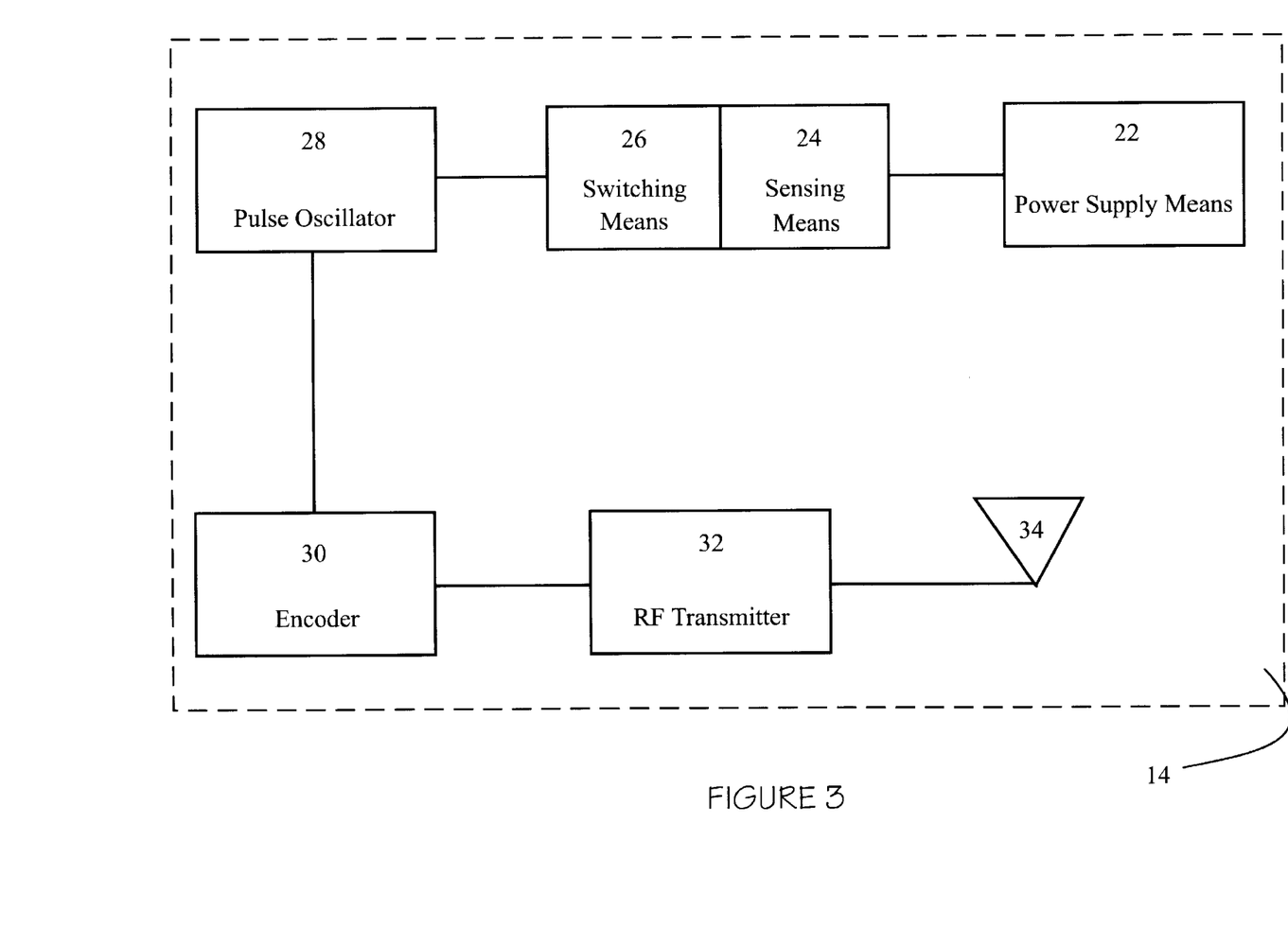
FIG. 3 is a block diagram of a preferred sensor-transmitter of the present invention.

Now considering FIG. 3, one will gain an understanding of the novel and nonobvious functionality of the present invention. FIG. 3 is a block diagram of a preferred sensor-transmitter 14 of the present invention, depicting the major features of its functioning. One critical aspect of the present design is the power supply means 22. One preferred power supply means 22 comprises a small lithium battery that is capable of withstanding the potential high temperatures (commonly in excess of 150° F.), without damage or electrical discharge; a battery such as this is currently available for retail purchase. Furthermore, the power supply means 22 may be equipped with a means for prolonging the life of the power supply means 22 by preventing a passivation layer from forming on the battery (a common ailment for batteries with long service lives). In its preferred form, this prolonging means (not shown) may be a thermistor connected to the battery. This thermistor will draw a very small current from the battery to prevent the passivation layer from forming on the battery. Furthermore, as the temperature changes at the sensor-transmitter 14 (and, consequently, the battery), the current drawn by the will increase at high temperatures and decrease at low temperatures, to parallel the charge effectiveness of the battery, since more current is necessary to prevent the formation of a passivation layer as the battery temperature increases.

Connected to the power supply means 22 is a sensing means 24, which is described in more detail in connection with FIG. 5. Briefly, the sensing means 24 is capable of detecting: (1) whether the sensor-transmitter 14 is in- or out-of-service, and (2) whether there is an abnormal condition within the tire (see FIG. 2). A unique aspect of the preferred sensing means 24 is that it preferably requires no electrical power to function, thereby prolonging the life of the power supply means 22.

Responsive to the sensing means 24 is a switching means 26. In its preferred form, the switching means 26 will only permit the sensor-transmitter 14 to draw current from the power supply means 22 when an abnormal condition is sensed within the tire (see FIG. 2) by the sensing means 24. Furthermore, when the sensor-transmitter 14 is "on the shelf", or not yet installed in a pressurized tire (see FIG. 2), the sensing means 24 will cause the switching means 26 to open the sensor-transmitter 14 circuit, such that no power is drawn from the power supply means 22. In such a manner, the power supply means 22 will last for at least the shelf life of the battery. Since replacement of the battery mandates tire (see FIG. 2) and sensor-transmitter 14 removal, long power supply means 22 lifespan is of critical importance; the present design has an estimated ten-year battery lifespan.

When the switching means 26 is energized, the pulse oscillator 28 receives electrical power, causing it to generate a low frequency signal to the encoder 30. The generated signal will have a duration of less than ⅓ of a second about every 15 seconds, a frequency that meets all current U.S. Federal Communications Commission regulations, and furthermore prolongs the life of the power supply means 22. The preferred encoder 30 will identify the outgoing signal for later identification by the receiver-display (see FIG. 1). The preferred encoder 30, readily available on the retail market, assigns a single digital code out of a approximately possible ½ million codes. As such, false alarms received by the receiver-display (see FIG. 1) are virtually impossible.

Finally, the sensor-transmitter includes a Radio Frequency transmitter 32 for transmitting the generated signal from the sensor-transmitter 14 to the receiver (see FIG. 1). As discussed previously, the RF transmitter 32 only receives power (and transmits a signal) when an abnormal condition is sensed within the tire (see FIG. 2) by the sensing means 24. As such, very little current is drawn from the power supply means 22 (i.e. from the thermistor), and the power supply means 22 can achieve a ten-year lifespan under normal operating conditions. The sensor-transmitter 14 may transmit its generated signal via an antenna 34 of common design. Not shown, but preferably present in this invention is a surface acoustic wave resonator to keep the sensor-transmitter 14 on its prescribed frequency and thus reduce the bandwidth needed for the input filter of the receiver, which will enable the receiver to reduce the possibility of jamming (the receiver-display) from radio frequency signals at other frequencies.

Figure 4:
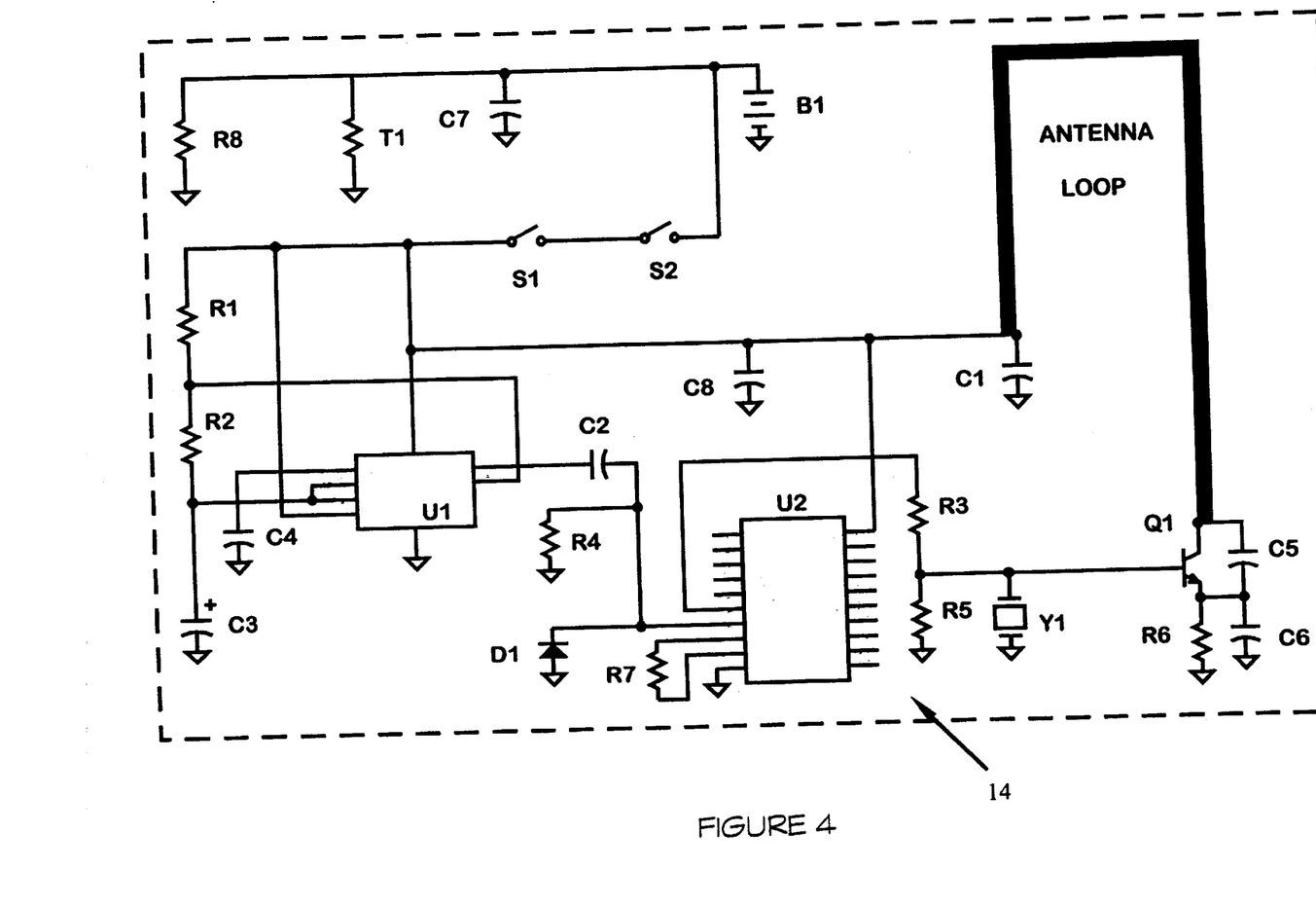
FIG. 4 is an electrical schematic of a preferred sensor-transmitter of the present invention.
Figure 5A:
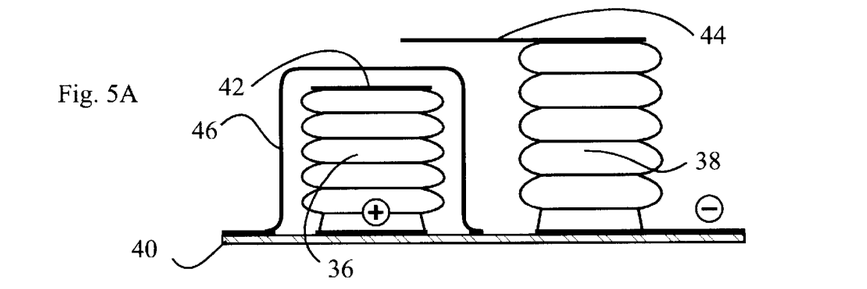
FIG. 5 is a series of side views of a preferred pair of bellows-switch combinations that may be used in the present invention.
Figure 5B:
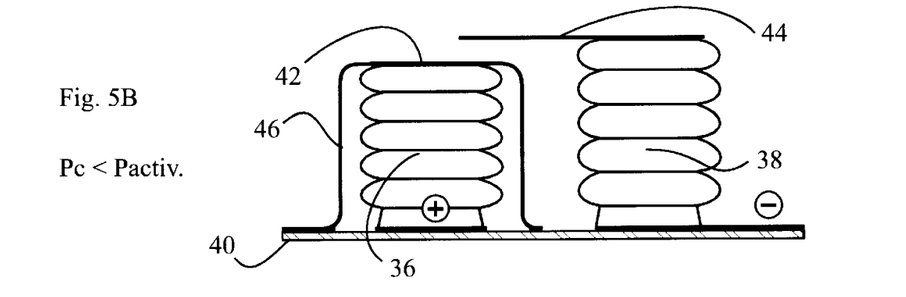
Figure 5C:
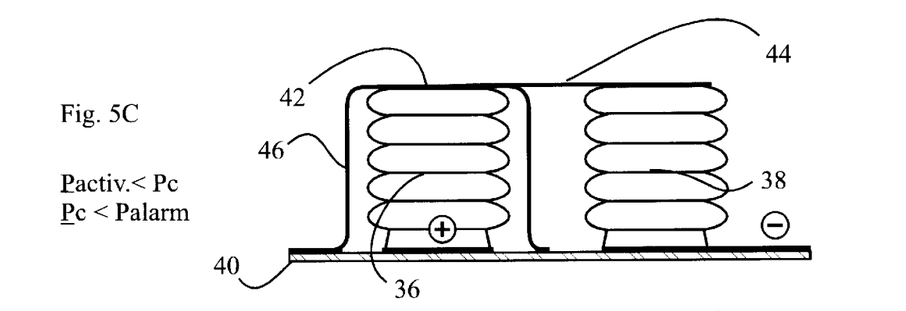
Figure 5D:
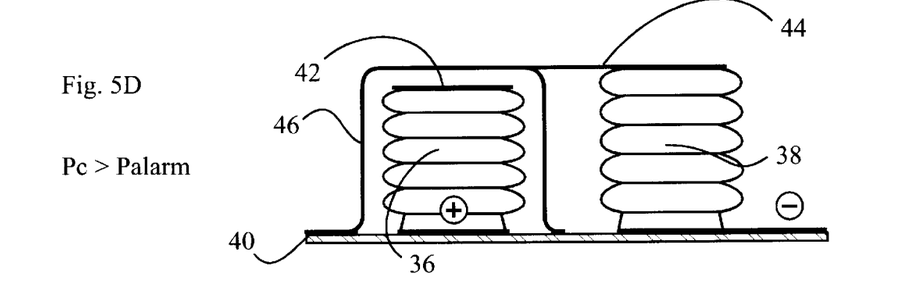

FIG. 4 is a detailed electrical schematic of a preferred sensor-transmitter 14 of the present invention. Other components and circuit designs may be utilized, depending upon the desired results; it is not the intention of the present invention to restrict the use of other frequencies, antennas, or methods of modulation. Further detail regarding the unique switching means (see FIG. 3), and as it relates to the sensing means (see FIG. 3) is provided below in connection with FIG. 5.

A unique and nonobvious feature of the present invention is the manner in which it constantly monitors the condition within the tire (see FIG. 2), but only draws power from the power supply means (see FIGS. 3 and 4) when an abnormal condition is detected; a preferred means for accomplishing this feature of functionality is best understood by consideration of FIG. 5. FIG. 5 is a series of side views of the preferred pair of bellows-switch combinations that may be used in the present invention. As can be seen in View "A", a preferred arrangement comprises a high pressure bellows 36 and a low pressure bellows 38 mounted to a nonconductive base 40, such as a Printed Circuit board. The bellows 36 and 38 are electrically conductive, pneumatically sealed, and preferably made from gold or gold-plated metal to prevent corrosion, oxidation or erosion.

Attached to the high pressure bellows 36 is an alarm switch means 42; attached to the low pressure bellows 38 is an activation switch means 44. Both switch means 42 and 44 are responsive and preferably in electrical contact with the bellows 36 and 38, respectively. As such, when the high pressure bellows 36 extends to the point that the alarm switch means 42 contacts the bracket 46, an electrical circuit will be completed between the high pressure bellows 36 and the bracket 46. As can be appreciated, when the low pressure bellows 38 retracts or shortens to the point that the activation switch means 44 contacts the bracket 46, and electrical circuit will be completed between the low pressure bellows 38 and the bracket 46. In order for the entire circuit to be completed, therefore, the high pressure bellows 36 must be extended until the alarm switch means 42 contacts the bracket at the same time that the low pressure bellows 38 is retracted or shortened to the point that the activation switch means 44 is also in contact with the bracket 46.

In order to operate properly, and as will be appreciated in connection with Views "B", "C", and "D", the low pressure bellows 38 is preferably configured to retract to complete its circuit with the bracket 46 when the pressure outside of the low pressure bellows 38 ($P_c$—the internal tire pressure) increases to equal "activation pressure" $P_{activ}$, or some pressure above atmospheric pressure which will indicate to the system that the sensor-transmitter (see FIGS. 1–4) is in-service; this may be 5 pounds per square inch, for example. The high pressure bellows 36 is configured to complete its circuit with bracket 46 whenever the tire pressure, $P_c$, is below the alarm pressure $P_{alarm}$. The alarm pressure $P_{alarm}$ must, therefore be greater than the activation pressure $P_{activ}$ in order for the presently described system to work properly. In order to fully describe the pertinent scenarios for $P_c$, and the functioning of the bellows 36 and 38 and the switches 42 and 44, we will now turn to Views "B", "C" and "D".

View "B" depicts the bellows and switch positions when tire pressure, $P_c$, is less than the activation pressure, $P_{activ}$. As can be seen, the high pressure bellows 36 is extended such that the alarm switch means 42 is in contact with the bracket 46, thereby completing one-half of the circuit. However, since the low pressure bellows 38 has not yet been caused to retract such that the activation switch means 44 is in contact with the bracket 46, the circuit remains open, and no power is supplied to the transmitter circuit (see FIGS. 3 and 4).

View "C" depicts the bellows and switch positions when tire pressure, $P_c$, is between (or equal to) the activation pressure $P_{activ}$, and the alarm pressure $P_{alarm}$. As can be seen here, the low pressure bellows 38 has now retracted until the activation switch means 44 is in contact with the bracket 46, and the entire circuit is completed. As a result, power is provided to the other components of the sensor-transmitter (see FIGS. 3 and 4), and an alarm signal is sent.

View "D" depicts the bellows and switch positions when tire pressure, $P_c$, is greater than the alarm pressure, $P_{alarm}$. In such a situation, the high pressure bellows 36 has been caused to retract until the alarm switch means 42 is no longer in contact with the bracket 46, thereby opening this half of the circuit. As a result, power is removed from the other components of the sensor-transmitter (see FIGS. 3 and 4), and the alarm signal is terminated.

It should be noted that in order to periodically test the present system, all that is required is that the operator slowly bleed off pressure within the tire until the alarm signal is activated. If the pressure is further bled off until the activation pressure is passed, the alarm signal should cease; the tire can then be re-filled. This test is extremely easy to conduct and takes very little time.

Many other sensor and switch combinations are possible, including single bellows, more than two bellows, and bellows that react to pressure changes with more complexity than simply extension and retraction. Reducing the number of bellows to one will be a significant improvement, since it is expected that the bellows will comprise a substantial portion of the cost of the system.

In a single bellows embodiment, the bellows may extend or retract to contact more than one switch position, such as "inactive", "alarm" and "normal" positions, as pressure increases. Alternatively, one, some or all bellows could be configured to twist around the same axis along which the bellows extends and retracts (i.e. twisting proportionally to the amount of extension). Such a twisting bellows could then be coupled to a potentiometer or other rotating device. The rotating device could then function to change the transmit frequency of the sensor-transmitter (see FIGS. 1–3).

Figure 6:
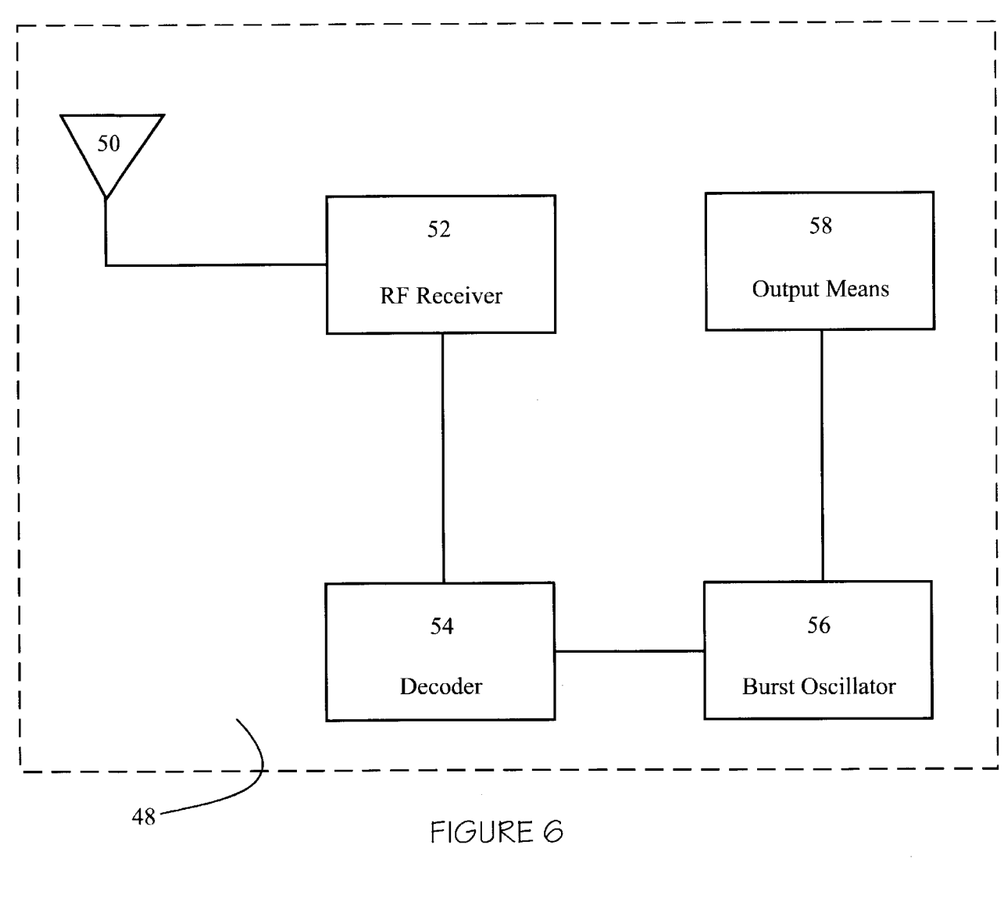
FIG. 6 is a block diagram of a preferred receiver-display of the present invention.

Having gained an appreciation of the sensor-transmitter (see FIGS. 1–5), we shall now turn to the receiver-display 48 of the present invention of which, FIG. 6 is a block diagram of a preferred form. Signals sent by the sensor-transmitter (see FIGS. 1–5) are received by the receiver-display 48 via the antenna 50. The preferred antenna 50 is a dipole-type coupled with a ¼ wavelength transmission line (a quarter wave coaxial balun, for example). A dipole antenna will give twice the signal strength of a monopole antenna, and the ¼ wavelength transmission line is a very inexpensive and low power loss way of converting the balanced output of the dipole antenna to the unbalanced input of the receiver filter (see FIG. 7).

The Radio Frequency Receiver 52 is preferably connected to the antenna 50. The preferred RF receiver 52 will include a surface acoustic wave filter at its input to reduce the possibility of jamming from radio frequency signals at other frequencies.

Once received, the signal enters the decoder 54 for analysis. If the signal is included within the proper codes, the burst oscillator 56 will be activated. The burst oscillator 56 will stretch the ⅓ second received signal into a 10-second pulsing signal in the receiver-display in order to provide an alarm of sufficient duration to insure detection by the vehicle's operator.

The output means 58 is any conventional means for providing a alert to the vehicle's operator that is perceptible to the human senses. This includes a variety of audio and/or visual alerts. Although the presently described embodiment combines the receiver means and the output means, it is not critical, or even particularly desirable that they be physically combined. It will typically be preferred, in fact, that the receiver means be located external to the vehicle's passenger compartment, while the output means is located within the passenger compartment. Furthermore, other receiver-display's 48 may be located apart from the vehicle altogether, such as at a "home base" so that a vehicle's tire condition can be monitored remotely, if desired.

The power for the receiver-display 48 preferably will come from the vehicle's battery, at least in part through the ignition switch, through a twisted pair of wires, and through the display means or sounding device, which is bypassed with a resistor. The return wire of the twisted pair is connected to the vehicle's ground near the ignition switch or fuse box. Consequently, when the decoder of the receiver-display 48 detects the correct code, it electronically shorts the twisted pair of wires, which applies full battery voltage across the display means or sounding device that then produces an audio or other alarm. Furthermore, whenever the ignition switch is first turned on, the receiver-display 48 will emit an audio or other alarm which indicates that the receiver-display 48 is turning on. It should further be appreciated that the configuration of the power supply lines to the receiver-display 48 is unique and nonobvious in that they function to both supply power to the receiver-display and send the warning signal to the output means 58.

Figure 7:
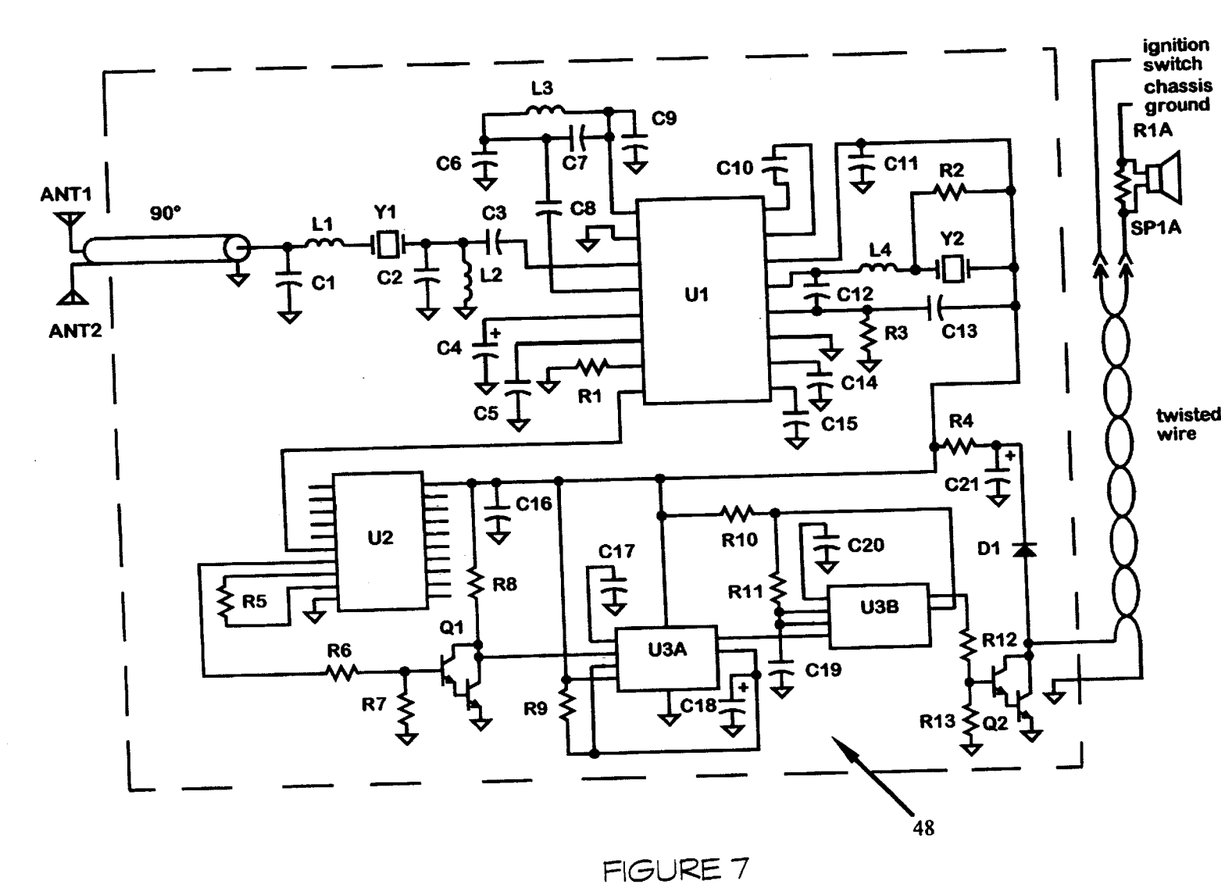
FIG. 7 is an electrical schematic of a preferred receiver-display of the present invention.

FIG. 7 is a detailed electrical schematic of a preferred receiver-display 48 of the present invention. While the receiver portion of the receiver-display 48 is a superhetrodine at this time, other components and circuit designs may be utilized, depending upon the desired results; it is not the intention of the present invention to restrict the use of other frequencies, antennas, or methods of modulation or demodulation.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A device for sensing a condition of a pneumatic chamber, comprising:

a base;

sensing means, associated with said base, for monitoring the chamber condition and detecting a normal condition an abnormal condition, and an inactive condition;

alarm circuit means, associated with said base, for generating signals indicative of the chamber condition, including:

switching means operatively connected to said alarm circuit means and responsive to said sensing means for de-energizing said alarm circuit means when said sensing means detects a normal condition and energizing said alarm circuit means when said sensing means detects an abnormal condition; and power supply means operatively connected to power said switching means and said alarm circuit means, said operative connection of said power supply means being disconnectable when said inactive condition is detected.

2. The device of claim 1, wherein:

said switching means comprises a first switch for de-energizing and energizing said alarm circuit means responsive to said sensing means detecting a normal or abnormal condition within the chamber; and said switching means comprises a second switch for de-energizing said first switch responsive to said sensing means detecting an off-line condition.

3. The device of claim 2, wherein said sensing means comprises:

a first sensor for detecting a normal condition and an abnormal condition within the chamber; and a second sensor for detecting an off-line condition within the chamber.

4. The device of claim 3, wherein said first switch and said second switch are gold-plated.

5. The device of claim 4, wherein:

said first sensor comprises a high pressure bellows, whereby said high pressure bellows compresses to a normal position when the chamber condition increases to normal pressure and said high pressure bellows expands to an alarm position when the chamber condition reduces to alarm pressure; and said second sensor comprises a low pressure bellows, whereby said low pressure bellows expands to an off-line position when the chamber condition reduces to off-line pressure and said low pressure bellows compresses to an activated position when the chamber condition increases to activation pressure, and wherein said alarm pressure is greater than said activation pressure.

6. The device of claim 5, wherein said alarm circuit means further includes means for prolonging the life of said power supply means by preventing said power supply means from forming a passivation layer thereon.

7. The device of claim 6 further comprising receiver means, and wherein said circuit means comprises transmitter means, whereby said receiver means cooperates with said transmitter means to provide an alert perceptible to the human senses when an abnormal condition is sensed in the chamber.

8. The device of claim 7, wherein:

said power supply means comprises a battery; and said prolonging means comprises a thermistor operatively connected to said battery to provide a small electrical current draw on said battery, said current draw responsive to the temperature of said battery.

9. The device of claim 8, further comprising means for mounting said base, said sensing means, said alarm circuit means and said power supply means within the chamber.

10. The device of claim 9, further comprising a casing disposed over substantially the entirety of said base, said sensing means, said alarm circuit means and said power supply means.

11. An improved vehicle pneumatic tire pressure sensor and low pressure alert system, comprising:

at least one transmitter means, each said transmitter means comprising:

a base;

a first sensor associated with said base for detecting a normal pressure condition and an abnormal pressure condition surrounding said transmitter;

a second sensor associated with said base for detecting an inactive pressure condition of a tire surrounding said transmitter;

alarm circuit means, associated with said base, for generating signals responsive to said first sensor and said second sensor; and power supply means operatively connected to power said alarm circuit means, said operative condition being disconnectable when said inactive pressure condition is detected; and at least one receiver means configured to provide alerts perceptible to the human senses responsive to said transmitter means.

12. The system of claim 11, further comprising means for mounting said at least one transmitter within the pneumatic tire.

13. The system of claim 12, further comprising a first switch and a second switch, said first and second switches operatively connected to said alarm circuit means wherein said first switch is responsive to said first sensor to energize and de-energize said alarm circuit means and said second switch is responsive to said second sensor to de-energize said alarm circuit means.

14. The system of claim 13, further comprising a casing disposed over substantially the entirety of each said at least one transmitter.

15. The system of claim 14, wherein:

said first and second switches are gold-plated; and said alarm circuit means further comprises a thermistor means operatively connected to said power supply means for drawing a small current on said power supply means responsive to the temperature of said power supply means.

16. An improved method for sensing a pressure of a pneumatic chamber, comprising the steps of:

monitoring the chamber pressure condition for a normal pressure condition, an abnormal pressure condition and an inactive pressure condition;

switching responsive to said monitoring to de-energize an alarm circuit means when either the normal pressure condition or the inactive pressure condition is detected and to energize said alarm circuit means when the abnormal pressure condition is detected;

disconnecting the alarm circuit means from a power supply when the inactive condition is detected;

generating an alarm signal;

encoding said alarm signal;

transmitting said alarm signal;

receiving said alarm signal;

decoding said received alarm signal; and displaying an alarm, responsive to said receiving, that is perceptible to the human senses.

17. The method of claim 16, further comprising:

installing a sensor-transmitter means within the pneumatic chamber; and whereby said sensor-transmitter performs said monitoring, switching, generating, encoding and transmitting steps.

18. The method of claim 17, wherein:

said sensor-transmitter further comprises a battery; and further comprising the step of drawing a temperature-variable current on said battery whereby buildup of a passivation layer on said battery is retarded.

19. The method of claim 18, further comprising the step of pulsing said alarm signal, prior to said transmitting, for about ⅓ second every about 15 seconds.

20. The method of claim 19, further comprising the step of stretching said received signal, prior to said displaying, from about ⅓ second to about 10 seconds in duration.

* * * * *